Oct. 17, 1939.　　　J. L. TAGGART　　　2,176,752
ICE CREAM DISPENSING INSTRUMENT
Original Filed April 28, 1937　　2 Sheets-Sheet 1
INVENTOR
James L. Taggart
BY
Christy and Wharton
his ATTORNEYS
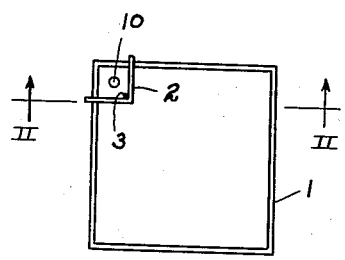
Fig. I.
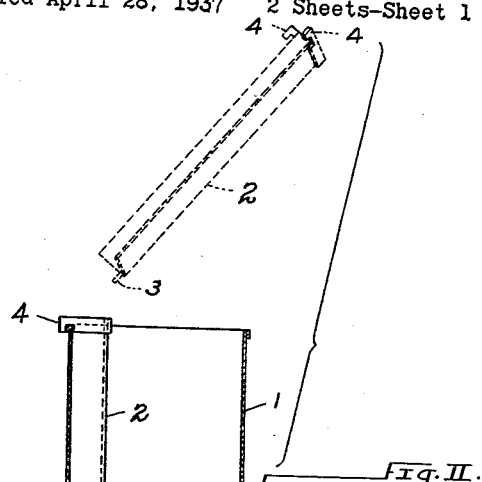
Fig. II.
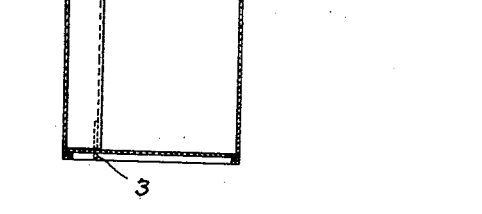
Fig. III.
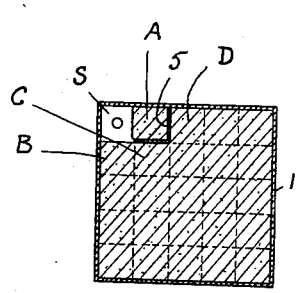
Fig. V.
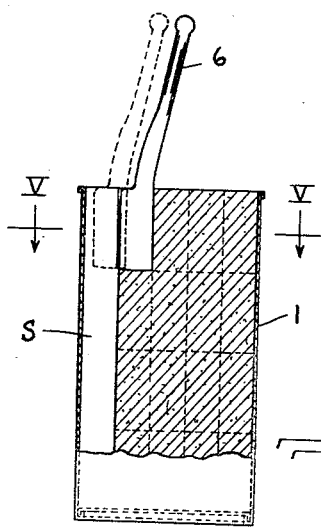
Fig. IV.
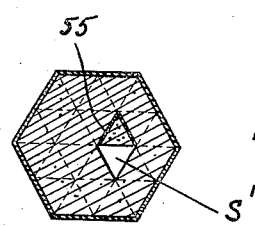
Fig. IX.

Oct. 17, 1939.  J. L. TAGGART  2,176,752
ICE CREAM DISPENSING INSTRUMENT
Original Filed April 28, 1937  2 Sheets-Sheet 2
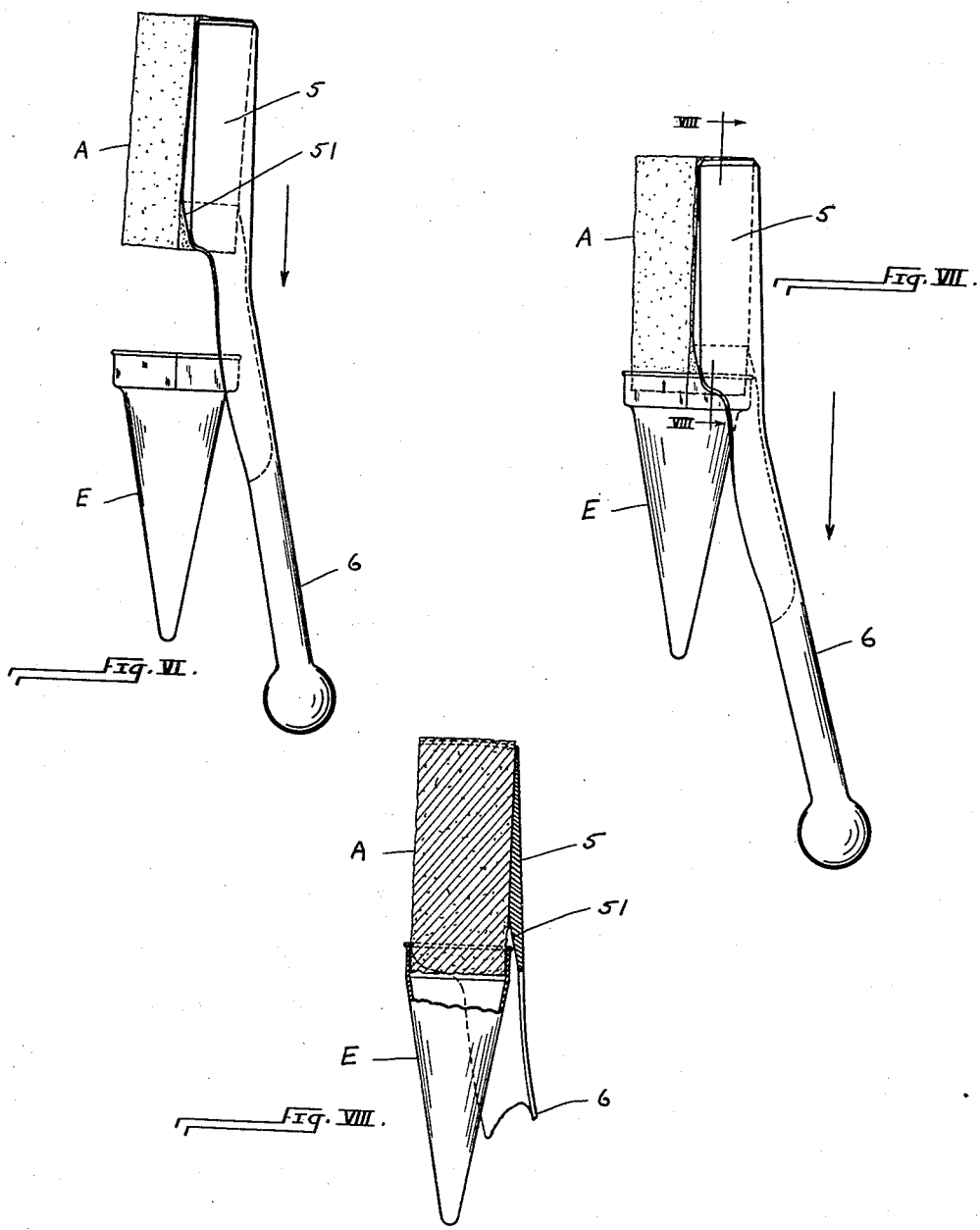

Patented Oct. 17, 1939

2,176,752

UNITED STATES PATENT OFFICE 2,176,752

ICE CREAM DISPENSING INSTRUMENT

James L. Taggart, Mount Pleasant, Pa.

Application April 28, 1937, Serial No. 139,588
Renewed December 19, 1938

4 Claims. (Cl. 107—48)

This invention relates to the dispensing of ice cream, and substances of like consistency, and consists in a dispensing instrument, adapted for service with a container of specific form and structure, and an instrument that serves as a gauge, determining with accuracy the quantity dispensed, and adapted readily to give up its burden of ice cream to an ice cream cone. The shape and proportions of the container and of the dispensing instrument are such that from the container the contained body of ice cream may be dispensed in approximate completeness and with minimum waste. The invention further consists in the method performed in the use of the apparatus.

In the accompanying drawings Fig. I is a view in plan of a container with which the instrument of the invention is adapted to serve; Fig. II is a view of the container in vertical section, in the plane indicated by the line II—II, Fig. I; Fig. III is a view in perspective of the dispensing instrument; Fig. IV is a view partly in elevation, partly in a plane that corresponds to the plane of Fig. II, in which the container is shown filled with ice cream, and the dispensing instrument is shown in application to the contents; Fig. V is a view in horizontal section, on the plane V—V, Fig. IV; Figs. VI, VII, and VIII are views to larger scale, illustrating, in elevation and in part in section, the transfer of a measured quantity of ice cream from the dispensing instrument to an ice cream cone; and Fig. IX is a view corresponding to Fig. V and illustrating permissible variations in form.

The container 1 is of columnar form, and conveniently of rectangular cross-section, as indicated in Figs. I, II, IV, and V. Accessory to the container is a spout member, ordinarily of thin sheet metal, applicable to and removable from the container, and forming when applied a through-way extending vertically within the container chamber. The container being of rectangular cross-section, the spout-member conveniently takes the form of a partition 2 of L-shaped cross-section (the arms of the L of equal length) which, being applied at one corner of the container, as indicated in Figs. I and II, forms with the container walls a rectangular spout within the container chamber. The spout member may at its lower end be provided with a pin 3 and at its upper end with hooked edges 4, and the bottom wall of the container may be perforated, that the pin 3 may, in assembly, pass through and that the spout member 2 may thus be anchored in the bottom wall. When the spout member is applied, its pin 2 penetrating the bottom wall and its hooks 4 engaging the rim of the container along adjacent and converging side walls, the spout member is fixed in the position shown in Figs. I and II. The bottom wall is additionally perforated, as at 10, within the area delimited by the spout member, and thus a through-way is provided for the passage of liquid, for purposes presently to be described.

The dispensing instrument, formed ordinarily of metal, consists of a blade 5, of angular (and, in this instance, of L-shaped) cross-section (the arms of the L equal in length) that preferably is wedge shaped, tapering from a relatively heavy heel to a relatively thin toe. The cross-sectional form of the blade will be seen on comparing Figs. III and V of the drawings, and the wedge shape will be seen in the longitudinal section, Fig. VIII. The inner surfaces of the instrument, from the heel of the blade rearward, are disposed at receding angles, whereby the rear edge of a portion of ice cream segregated by the instrument and protruding rearward from the blade may be accessible to and may be caused to enter the mouth of an applied ice cream cone, as shown in Figs. VI, VII and VIII. Specifically, the body of the handle is recessed or offset, say by means of a groove 60, in the region of mergence of the handle with the heel of the L-shaped blade 5. Additionally, at such region of mergence the planes of the inner faces of the blade may be offset or thrown back in bevels 51.

In specific dimensions there preferably are established ratios. The walls of the L-shaped spout member 2 and of the blade 5 are of equal width. The walls of the container 1 are, in width, a multiple of the width of spout member and of dispenser blade, and, in height, a multiple of the length of the dispenser blade. In a particular instance the width of each of the angled walls of spout member and of dispenser blade is an inch and a quarter and the length of the dispenser blade is four inches. The container walls are here shown to be of a width five times that of spout-member wall (=6¼ inches)—ordinarily the container walls will be of much greater width than that—and the container walls are here shown to be of a height four times the length of the dispenser blade (=16 inches).

In service the spout member 2 is brought to position in the container, as shown in Fig. I, and (in full lines) in Fig. II. The container then is filled with ice cream, already frozen, only the space defined by the spout being left empty. The so filled container may be suitably closed and packed. When the contents are to be dispensed, the container is opened. A warming stream (conveniently of water) is then poured through the spout, until the ice cream in immediate contact with the surface of the spout member 2 is softened. The spout member then is withdrawn from the container, and the body of ice cream remains in block form, with a columnar space S, square in cross-section, at one corner. Dispensing of the ice cream follows. The dispensing instrument is sunk vertically into the upper surface of the block of ice cream, at a point adjacent the open corner, and precisely in the position shown in Fig. V and (in full lines) in Fig. IV. It will be seen that the dispensing instrument by its shape and proportions enables the one who is dispensing thus accurately to cleave and segregate within the angle of the instrument a column of ice cream of exact size (in this instance, an inch and a quarter square). The wedge shape of the blade has the effect of compressing the column and of tipping it slightly into the corner space. When the blade has been sunk to the limit of its vertical extent, it is shifted laterally, carrying the segregated column into the corner space S; and freeing the column at its base from the underlying body of ice cream. The completely cleft and severed column of ice cream may now be removed with the dispensing instrument. In Figs. VI, VII, and VIII this removed columnar body or portion A is shown in position in the dispensing instrument. It will particularly be noted that at the heel the column of ice cream stands away from the beveled face of the blade; and that, in consequence of the angled position of the handle, the end of the column (the upper end, as it stood in the container) is accessible.

An ice cream cone E is provided whose mouth is conveniently of contour and size corresponding to the portion of ice cream borne by the dispensing instrument (in this instance square, and, with allowance, 1¼ x 1¼ inches interiorly). The dispensing instrument with its burden is inverted, the cone applied from below, and by relative movement, the portion of ice cream is stripped from the dispensing instrument and left properly seated in the cone, ready for delivery.

In this dispensing operation it will be perceived that the plasticity of the body of ice cream, its coherence, and its brittleness too, are all taken advantage of, and its adhesiveness to the surfaces of the dispensing instrument as well.

One columnar portion having thus been removed, other like portions, B, C, D, etc., may, similarly, be removed, until the whole body of ice cream to the depth of four inches has so been dispensed. The columnar portions in the aggregate make up the whole of the cross-sectional extent of the original mass. The first layer being gone, a second layer may similarly be taken. In Figs. IV and V the planes of separation of the portions are indicated in dotted lines. It will be understood that, with such a plastic and superficially softening substance as ice cream, the accuracy of subdivision will for all intents and purposes be sufficiently complete. And it will be seen that by adapting ratios such as specified the whole body of ice cream in the container may, with very small wastage, be dispensed.

While I have described the removal of columnar portions of size suitable to be retailed in ice cream cones, it will be understood that similarly larger blocks than those suitable for such retailing may be segregated, and that they may be transferred from the dispensing instrument to cartons or other containers, to be carried away for consumption elsewhere.

Fig. IX serves to show that the columnar space S', instead of being formed at the periphery of the body of ice cream within the container, may be formed wholly within the body. In such case, as will immediately be understood, the spout member (not shown) will itself be a complete tube, of proper cross-sectional shape and size to form the columnar space S'. This Figure IX serves also to show that the columnar portions separated from the body of ice cream and dispensed need not be rectangular, but may for instance be triangular in cross-section. In such case the spout member will be of triangular cross-section and the two walls of the blade 55 of the dispensing instrument will stand at an angle, not of 90°, but of 60° to one another. In this case the removal of the first columnar portion will effect a slight mutilation of the adjacent surfaces of the remaining mass, but the disfigurement will be insignificant in extent.

The apparatus, manifestly, is applicable for use in the dispensing of plastic material generally that is comparable with ice cream in consistency.

In the use of the apparatus in the manner described the method of the invention is performed.

I claim as my invention:

1. A dispensing instrument for ice cream and the like consisting of a blade borne rigidly upon a handle, the blade being of L-shape in cross section, and the handle, extending from the blade at a receding angle, being recessed in the region of mergence of the handle with the blade, whereby the rear edge of a portion of ice cream segregated by the instrument and protruding rearward from the blade may be accessible to and may be caused to enter the mouth of an applied ice cream cone.

2. The structure of claim 1, in which said recess consists in a groove formed in the body of the handle and providing offset continuations of the inner surfaces of said blade.

3. A dispensing instrument for ice cream and the like, adapted for cooperation with a container equipped with a removable space-defining spout, such instrument consisting of a blade including two blade portions extending angularly to one another as viewed in cross section and of wedge shape in longitudinal section borne rigidly upon a handle and adapted to be sunk into a body of ice cream within such container, the inner face of each blade portion being disposed at the toe and heel of the blade in planes that extend angularly to one another, whereby an offset is formed at the heel of the blade.

4. A dispensing instrument for ice cream and the like, consisting of a blade borne rigidly upon a handle, the blade including two blade portions that extend angularly to one another as viewed in cross section and that are of wedge shape in longitudinal section, the inner face of the blade from the toe rearward extending in continuous planes and at the heel being beveled, and the handle extending from the blade at a receding angle with respect to the planes of the toe areas of the face of the blade.

JAMES L. TAGGART.